US006224326B1

(12) United States Patent
Puech

(10) Patent No.: US 6,224,326 B1
(45) Date of Patent: May 1, 2001

(54) METHOD AND APPARATUS FOR PREVENTING DEPOSITS FROM FORMING IN A TURBOMOLECULAR PUMP HAVING MAGNETIC OR GAS BEARINGS

(75) Inventor: Michel Puech, Metz Tessy (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/392,586

(22) Filed: Sep. 9, 1999

(30) Foreign Application Priority Data

Sep. 10, 1998 (FR) .................................................. 98 11296

(51) Int. Cl.[7] ........................................................ F03D 5/00
(52) U.S. Cl. ................................................................ 415/90
(58) Field of Search .......................... 415/90, 116, 169.1, 415/168.1; 417/423.1, 424.1

(56) References Cited

U.S. PATENT DOCUMENTS 4,512,725 4/1985 Saulgeot .
4,904,155 * 2/1990 Nagaoka et al. ........................ 415/90
5,443,368 * 8/1995 Weeks et al. .......................... 417/27
5,522,694 * 6/1996 Bernhardt et al. ..................... 415/14
5,577,883 * 11/1996 Schutz et al. .......................... 415/90
5,688,106 * 11/1997 Cerruti et al. ......................... 415/90

FOREIGN PATENT DOCUMENTS 0 408 792 A1 1/1991 (EP) .
0 451 708 A2 10/1991 (EP) .
0 695 873 A1 2/1996 (EP) .

* cited by examiner

*Primary Examiner*—F. Daniel Lopez
*Assistant Examiner*—Ninh Nguyen
(74) *Attorney, Agent, or Firm*—Sughrue, Mion, Zinn, Macpeak & Seas, PLLC

(57) ABSTRACT

In the invention, deposits that disturb electrical discharges between the rotor and the stator inside a turbomolecular pump with a plurality of stages on magnetic or gas bearings are prevented from forming by injecting an active gas at at least one suitable location inside the pump via at least one gas intake pipe, which active gas reacts with the deposit-generating molecules and forms gaseous compounds that are removed by the pump. Such deposits are thus prevented from forming without disturbing the conductance of the pump or adversely affecting the atmosphere present in the enclosure to which the pump is connected.

10 Claims, 1 Drawing Sheet

METHOD AND APPARATUS FOR PREVENTING DEPOSITS FROM FORMING IN A TURBOMOLECULAR PUMP HAVING MAGNETIC OR GAS BEARINGS

The present invention relates to turbomolecular pumps which, associated with primary pumps, make it possible to generate and sustain a hard vacuum in an enclosure.

BACKGROUND OF THE INVENTION

In general, a turbomolecular pump comprises a rotor and a stator having a plurality of stages, the rotor being carried by bearings. Going from the inside of the enclosure towards the outside, the gas pressure increases progressively from one stage to the next, and the stages close to the inside of the enclosure are considered to be low-pressure stages, while the stages close to the outlet are considered to be high-pressure stages.

When it includes magnetic or gas bearings for supporting the rotor, such a turbomolecular pump has the characteristic that its rotor is isolated physically and therefore electrically from the stator and from the body of the pump which finds itself at reference potential, i.e. at the ground potential of the equipment.

Turbomolecular pumps are frequently used in plasma deposition or etching equipment in the semiconductor industry.

While such turbomolecular pumps are being used in plasma deposition or etching processes, it has been observed that deposits tend to form of materials coming from the reaction products. For example, in a turbomolecular pump used in a plasma etching machine for etching semiconductor materials, residues coming from the etching of the resin masks tend to deposit on the inside surfaces of the rotor and of the stator, and to do so preferentially in the high-pressure stages of the turbomolecular pump.

In addition, in plasma deposition or etching methods, the turbomolecular pump and in particular its rotor are in direct contact with the plasma. As a result, the rotor, which is electrically isolated, is taken to a potential that is different from ground potential.

The pressure conditions in the high-pressure portion of the turbomolecular pump, combined with the short distance between the rotor and the stator and also with the potential difference between the rotor and the stator cause electrical discharges to occur between the rotor and the stator. In the absence of deposits, such discharges are distributed uniformly between the surfaces of the rotor and of the stator, and they do not do any damage.

Unfortunately, when deposits form, they disturb the discharges by creating preferential paths, and zones are created in which arc conditions occur in which high current densities are set up, thereby rapidly damaging the rotor.

In the prior art, attempts have already been made to remedy this problem in various ways.

In a first solution, a grid connected to ground has been interposed between the turbomolecular pump and the plasma in the enclosure. Unfortunately, the high density of the plasmas used requires very fine-mesh grids, sometimes of mesh size less than 100 $\mu$m. Under such conditions, the presence of grids reduces the conductance of the pump considerably, and significantly reduces its pumping speed. In addition, such a very fine-mesh grid is a site on which deposits form that can then generate particles detrimental to the industrial process that is performed in the enclosure.

In another solution, attempts have been made to prevent deposits from forming by increasing the temperature of the turbomolecular pump so as to avoid deposition by condensation. However, given the nature of the materials used and the high speed of rotation of the rotor, temperatures are rapidly reached that generate phenomena of material creep, thereby destroying the pump without even being effective in preventing deposits from forming.

OBJECTS AND SUMMARY OF THE INVENTION

The problem that the present invention proposes to solve is that of preventing the formation of deposits that would disturb the electrical discharges inside a turbomolecular pump having magnetic or gas bearings and connected to an enclosure containing plasma, without significantly adversely affecting pumping speed or the industrial process inside the enclosure.

Thus, an object of the invention is to design other means which, without interposing an intermediate grid or significantly increasing the temperature of the materials, prevents discharge-disturbing deposits from forming in a turbomolecular pump having magnetic or gas bearings and connected to a plasma enclosure.

To achieve these objects and others, the invention provides a method of preventing deposits from forming that would disturb electrical discharges between the rotor and the stator inside a turbomolecular pump with a plurality of stages on magnetic or gas bearings; in this method, an active gas is injected at at least one suitable location inside the turbomolecular pump, which active gas reacts with the deposit-generating molecules and forms gaseous compounds that are removed by the turbomolecular pump.

Excellent effectiveness is obtained by choosing an active gas that is dissociated and/or activated under the action of the electrical discharges between the rotor and the stator so as to react with the deposit-generating molecules.

In the method, the active gas is injected only into those stages in which the deposits are likely to occur. Generally, these stages are the high-pressure stages of the turbomolecular pump. In practice, it is possible to inject the active gas into the last turbomolecular stages, and/or into the Holweck stage when the pump is provided with such a stage.

In numerous applications, the active gas that is injected may advantageously be oxygen or contain oxygen. When it dissociates under the action of the electrical discharges, the oxygen produces oxygen atoms that are highly reactive and that combine effectively, in particular with the organic residues generated by the industrial processes, so as to form volatile molecules of the carbon monoxide, carbon dioxide, or water types, which are then removed along with the other gaseous compounds coming from the plasma enclosure.

The invention provides a turbomolecular pump for implementing such a method and having a rotor and a stator with a plurality of stages on magnetic or gas bearings; the turbomolecular pump includes means for injecting an active gas at at least one suitable location inside the turbomolecular pump, which active gas reacts with the deposit-generating molecules and forms gaseous compounds that are removed by the turbomolecular pump.

The turbomolecular pump of the invention may advantageously be provided with at least one gas intake pipe positioned so as to bring the active gas into the path of the gases flowing between the rotor and the stator in the last turbomolecular stages, and/or in the Holweck stage when the pump is provided with such a stage.

The turbomolecular pump of the invention may advantageously be associated with an external active gas source and with control means for delivering the active gas in a quantity that is sufficient to prevent deposits from forming.

BRIEF DESCRIPTION OF THE DRAWING

Other objects, characteristics, and advantages of the present invention appear from the following description of particular embodiments, given with reference to the accompanying figure which is a diagrammatic view in longitudinal section on the axis of rotation of a first embodiment of a hybrid turbomolecular pump of the present invention.

MORE DETAILED DESCRIPTION

Figure 1:
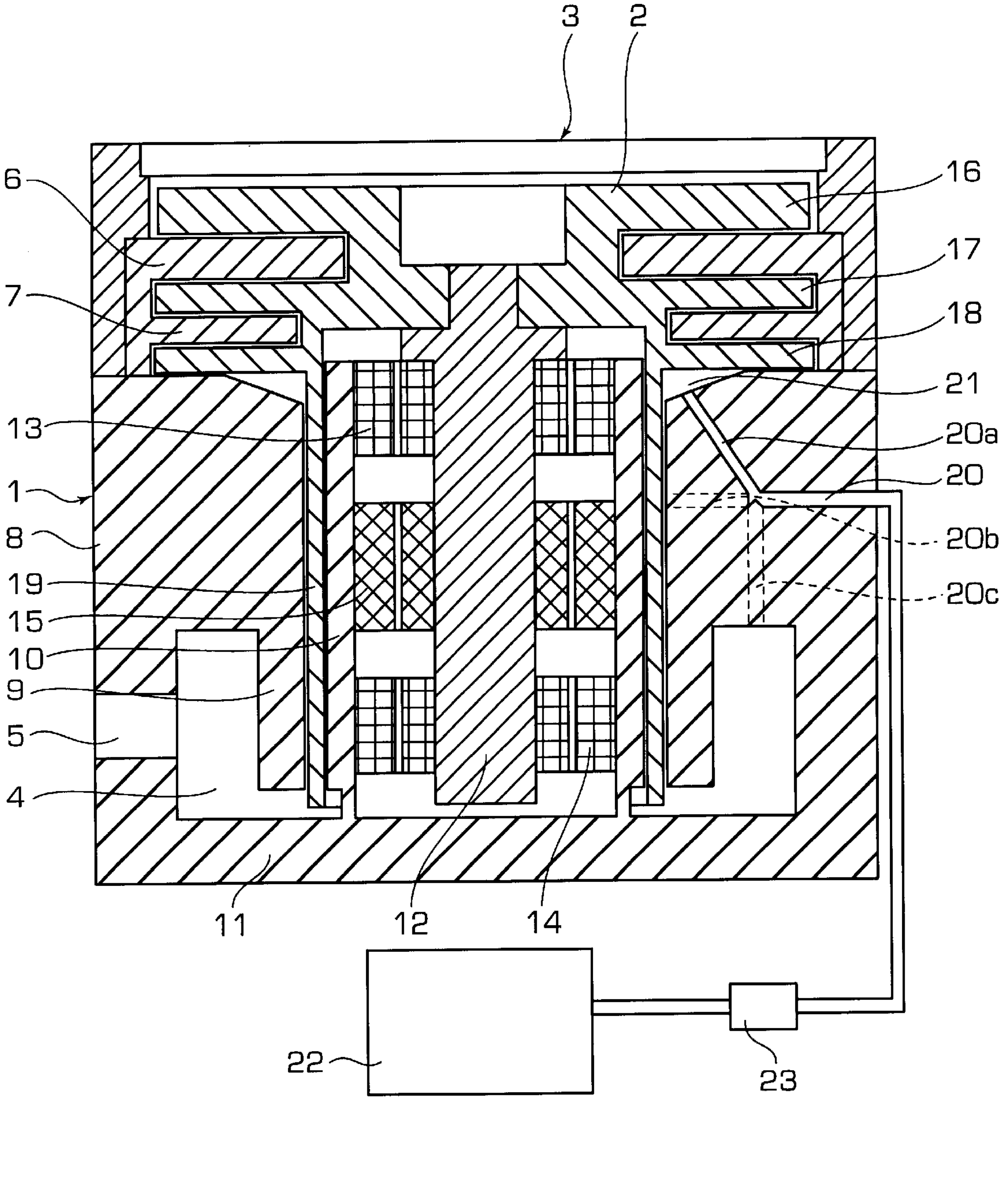

In the embodiment shown in FIG. 1, the turbomolecular pump of the invention comprises a conventional hybrid structure, with a stator 1 and a rotor 2 having a plurality of stages. The top of the stator 1 is open to form a suction inlet 3, and the stator is provided with an internal recess that is shaped to receive the rotor 2, with a bottom annular volume 4 for collecting the pumped gases and communicating with a bottom delivery outlet 5 on the side.

In the embodiment shown in the figure, and starting from the suction inlet 3, the stator 1 is provided with a plurality of stationary blade stages such as the stages 6 and 7, followed by a Holweck-type stator stage 8 with an outer tubular Holweck stator portion 9 and an inner tubular Holweck stator portion 10 that are coaxial and that are connected together via the bottom 11 so as to form between them an annular chimney communicating with the bottom annular volume 4.

The rotor 2 is secured to a shaft 12 carried by magnetic or gas bearings 13 and 14, and it is rotated about its axis in known manner by coils constituting the stator winding and the rotor winding of an electric motor 15.

The rotor 2 comprises a plurality of stages, including a plurality of rotor blade stages 16, 17, and 18 followed by a tubular Holweck rotor 19 engaged in the annular chimney between the outer tubular portion 9 and the inner tubular portion 10 of the Holweck Stator 8.

The various stages of the turbomolecular pump of the invention may have structures such as those used conventionally in turbomolecular pumps.

In a turbomolecular pump structure as shown in FIG. 1, it can be considered that the first turbomolecular stages constituted by the stator blades 6 and 7 and by the rotor blades 16 and 17 constitute low-pressure stages, and that the turbomolecular stage constituted by the state blade 7 and by the rotor blade 18 followed by the Holweck stage 8–10 and 19 constitute high pressure stages. In the high-pressure stages, the distances between the mutually-facing surfaces of the stator 1 and of the rotor 2 are small, and the gas pressures are such that the conditions are ripe for electrical discharges to occur between the rotor 2, which is electrically isolated and at a floating potential, and the stator 1, which is grounded. In parallel, solid matter tends to be deposited on the facing surfaces of the stator 1 and of the rotor 2, in particular on the surfaces of the high-pressure stage constituted by the blades 7 and 18, and on the Holweck stage 8–10 and 19. In particular, such deposits tend to form at the interface between the outer tubular portion 9 of the Holweck stator 8 and the tubular Holweck rotor stage 19.

In the invention, the turbomolecular pump further includes means for injecting an active gas at at least one suitable location inside the pump, which active gas is suitable for reacting with the deposit-generating molecules to form gaseous compounds that are removed by the pump. The active gas must be present in the interface zones between the stator 1 and the rotor 2 where the deposits are likely to form.

Thus, as shown in FIG. 1, the pump is provided with at least one gas-intake pipe 20 positioned to feed the active gas between the rotor 2 and the stator 1 in the high-pressure stages of the turbomolecular pump.

In an advantageous embodiment, a gas intake pipe 20 feeds the active gas into the high-pressure turbomolecular stages so that the active gas also propagates into the Holweck stage that follows.

In the embodiment shown in uninterrupted lines in FIG. 1, a gas intake pipe 20 conveys the active gas to the inlet 21 of the Holweck stage, into a top annular volume, via a pipe branch 20*a*.

The turbomolecular pump shown in FIG. 1 is associated with an external active gas source 22 and with control means 23 for delivering the active gas in a quantity just sufficient to prevent deposits from forming that could disturb the electrical discharge conditions between the stator 1 and the rotor 2. In particular, it is possible to control the flow rate of the active gas by means of a calibrated valve or a microleakage valve operating continuously or intermittently.

By way of an alternative, it is possible to feed the active gas to an intermediate position along the Holweck stage via a pipe branch 20*b*, or into the bottom annular volume 4 via a pipe branch 20*c*.

Depending on the applications and on the types of turbomolecular pumps, it might be advantageous to inject the active gas(es) into a plurality of interface zones distributed along the path of the gaseous flows between the rotor 2 and the stator 1. When active gas is injected into a plurality of interface zones, a specific active gas intake pipe provided with specific control means is preferably used for each interface zone, starting from a common external source 22 of active gas.

During pump operation, the invention thus prevents deposits from forming that would disturb electrical discharges between the rotor 2 and the stator 1 inside the turbomolecular pump having a plurality of stages on magnetic or gas bearings 13 and 14, and it does so by injecting an active gas at at least one suitable location 21 inside the pump, which active gas reacts with the deposit-generating molecules and forms gaseous compounds that are removed by the pump.

By way of example, when a turbomolecular pump is used on a plasma etching machine for etching semiconductor materials, it may be advantageous to inject oxygen as the active gas. In practice, a specific active gas or a specific active gas mixture is chosen that is suitable for the molecules generated by the industrial process taking place in the enclosure.

Injecting a gas into the high-pressure stages in no way disturbs the atmosphere prevailing inside the plasma enclosure, and it is effective in preventing deposits from forming that would disturb electrical discharge conditions between the stator 1 and the rotor 2. The pumping speed of the system is not disturbed, and nor is the temperature of the pump.

The present invention is not limited to the embodiments explicitly described, but rather it includes the various variants and generalizations that are accessible to the person skilled in the art.

What is claimed is:

1. A method of preventing deposits from forming that would disturb electrical discharges between the rotor and the stator inside a turbomolecular pump with a plurality of stages on magnetic or gas bearings, wherein an active gas is injected at at least one suitable location inside the turbomolecular pump, which active gas reacts with the deposit-generating molecules and forms gaseous compounds that are removed by the turbomolecular pump.

2. A method according to claim 1, wherein an active gas is chosen that is dissociated and/or activated under the action of the electrical discharges between the rotor and the stator so as to react with the deposit-generating molecules.

3. A method according to claim 1, wherein the active gas is injected into the high-pressure stages of the turbomolecular pump.

4. A method according to claim 3, wherein the active gas is injected into the last turbomolecular stages.

5. A method according to claim 3, wherein the active gas is injected into the Holweck stage when the pump is provided with such a stage.

6. A method according to claim 1, wherein the active gas that is injected contains oxygen.

7. A turbomolecular pump having a rotor and a stator with a plurality of stages on magnetic or gas bearings, for implementing a method according to claim 1, said pump including means for injecting an active gas at at least one suitable location inside the turbomolecular pump, which active gas reacts with the deposit-generating molecules and forms gaseous compounds that are removed by the turbomolecular pump.

8. A turbomolecular pump according to claim 7, provided with at least one gas intake pipe positioned so as to bring the active gas between the rotor and the stator in the last turbomolecular stages, and/or in the Holweck stage when the pump is provided with such a stage.

9. A turbomolecular pump according to claim 8, provided with a Holweck stage, wherein a gas intake pipe conveys the active gas to the inlet of the Holweck stage.

10. A turbomolecular pump according to claim 7, associated with an external active gas source and with control means for delivering the active gas in a quantity that is sufficient to prevent deposits from forming between the rotor and the stator.

* * * * *